3,178,962
ACCELERATOR PEDALS OF AUTOMOBILE VEHICLES

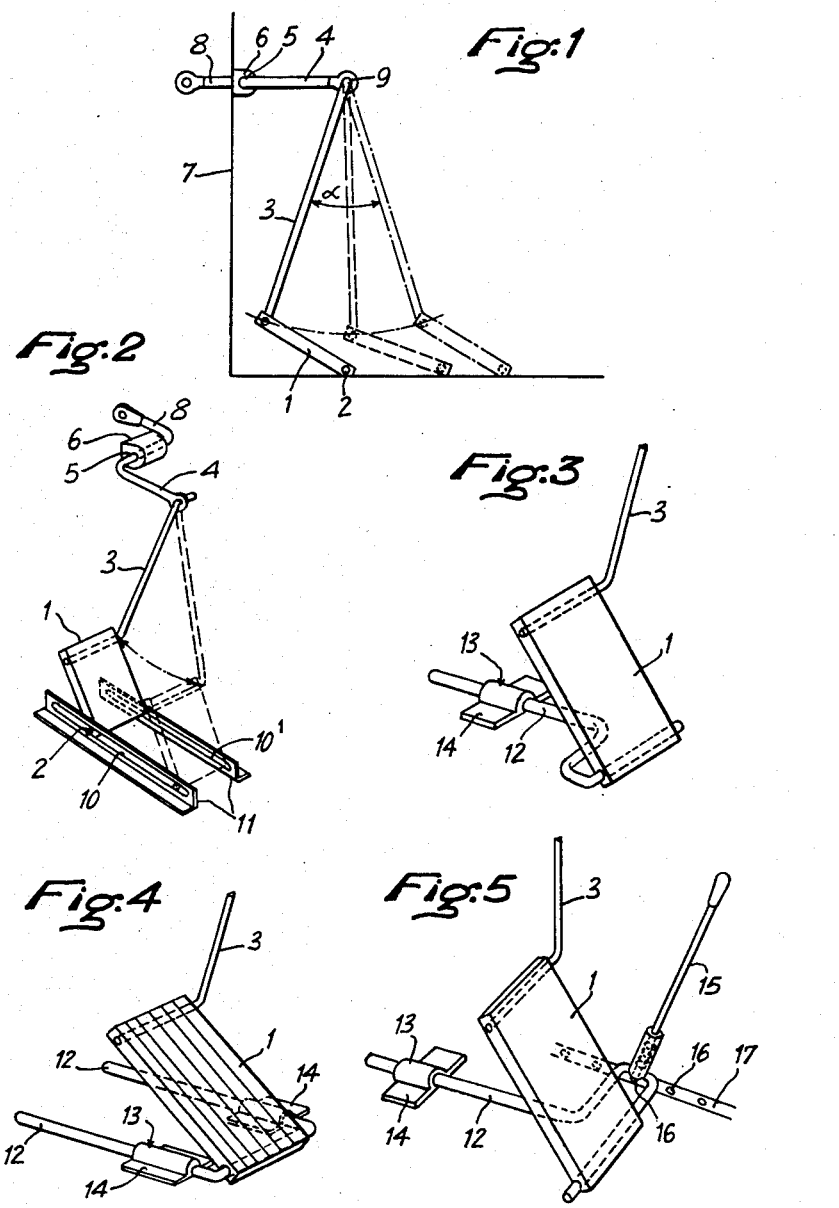

Lucien Péras, Billancourt, France, assignor to Regie Nationale des Usines Renault, Billancourt, France
Filed Nov. 15, 1962, Ser. No. 237,848
Claims priority, application France, Jan. 4, 1962, 883,883, Patent 1,317,966
2 Claims. (Cl. 74—561)

This invention relates to accelerator pedals of automobile vehicles and has specific reference to improvements in the mounting of a pedal of the so-called plate or harmonium type which permits an easy adjustment of the pedal position according to the driver of the vehicle.

It is known that it is difficult to design an accelerator pedal suitable for all conditions of operation; thus notably, women drivers wearing high heels can scarcely accommodate themselves to an accelerator pedal designed for, say, a foot wearing a stout-laced boot.

It is the object of the present invention to provide an improved accelerator pedal adapted to be adjusted instantaneously as a function of the size and type of footwear used by the driver.

The improvements constituting the subject-matter of this invention consist essentially in mounting the pedal on a sliding support, or a support in which the pedal can slide by means of its pivot pin, and connecting said pedal through a link of adequate length and angular position to a lever secured preferably on the dashboard of the vehicle and controlling the carburettor throttle or slider.

In order to afford a clearer understanding of this invention and of the manner in which the same may be carried out in practice, reference will now be made to the accompanying drawing in which:

FIGURE 1 is a diagrammatic view showing an accelerator pedal mounted according to the teachings of this invention;

FIGURE 2 illustrates the mounting of an accelerator pedal adapted to slide on its support;

FIGURE 3 illustrates a pedal pivotally mounted on a rod sliding in a single guide;

FIGURE 4 illustrates a pedal pivotally mounted on a rod having parallel portions sliding in parallel guides, and FIGURE 5 is another exemplary embodiment showing a sliding-support pedal with means for locking the pedal support in various adjustment positions.

Referring to the drawing and more particularly to FIG. 1, it will be seen that the blade or harmonium pedal 1 is pivotally mounted at 2 on a support secured on the vehicle floor. The pedal end opposite to the pivot axis is connected through a relatively long link 3 of adequate length and extending in a suitable direction to a lever 4 having an arm section 5 bent at right angles and adapted to pivot in a support 6 carried by the dashboard 7; the arm 5 projects from the other side of the support 6 and has a bent extension 8 parallel to the arm section 5, and the outer end of this extension 8 is connected through linkage or cable means to the carburettor throttle or slide.

The pivot pin 2 on which the pedal is mounted is carried for example by a support slidably mounted on the front floor of the vehicle so that the pedal position may be adjusted as more convenient to the driver. It will be seen that during this adjustment movement the axis of the pivotal connection between the link 3 and the pedal describes a circular arc centered at 9 on the lever 4. The useful angular movement for an adjustment not interfering with the conditions of operation of the carburettor control corresponds for example to an angle $\alpha$. It is clear that the horizontal position of the pedal pivot axis has no or little influence on the reduction ratio or leverage ratio of the carburettor control.

In the form of embodiment illustrated in FIG. 2 the end portions of the pivot pin 2 of pedal 1 are displaceable in grooves or slots 10, $10^1$ of the pedal support 11 secured on the floor.

In the alternate embodiment shown in FIGS. 3 and 4 the blade 1 is carried by a single or double supporting rod 12 acting at the same time as a pivot pin therefor, these rods 12 being adapted to slide in frictional engagement in half-shells or bearings 13 integral with flanges or webs 14 secured on the floor of the vehicle.

The pedal adjustment may be effected directly with the foot, by taking advantage of the frictional engagement between the rods 12 and the guide shells or bearings. The frictional contact between the end portions of pin 2 and the inner surface of guide members 10, $10^1$ may also be used for adjusting the position of the harmonium-type pedal shown in this figure.

In the exemplary embodiment illustrated in FIG. 5 the rod 12 supporting the pedal 1 is also displaceable in a shell or bearing 13, but the pedal can be locked in the desired adjustment position by means of a spring-loaded bolt or lever 15 carried by a cranked portion of rod 12 and adapted to engage notches or like openings 16 formed in a strip 17 secured on the floor of the vehicle.

I claim:

1. An accelerator pedal assembly in which the angle of inclination of the pedal to the floor can be adjusted in accordance with the angle formed by the foot and leg of a driver without changing the throttle setting, comprising, in combination, a crank-shaped lever pivotally mounted in a bracket for movement about a horizontal axis, the arms of said lever normally lying in the same plane as the axis of pivot, one arm of said lever extending forward from said bracket on the engine side and connectable to the fuel control of said engine, the other arm of said lever extending from said bracket toward said driver, a link pivotally connected at its upper end to the end of said other arm and depending therefrom, an accelerator pedal of the harmonium type pivotally attached at its upper end to the lower end of said link and means pivotally mounting the lower end of said pedal for slidable movement of said pedal to adjust said angle of inclination, comprising a U-shaped element, the shanks of which are slidably mounted in bearings secured to said floor, the base of which element passes through said pedal lower end in a pivotal manner.

2. An accelerator pedal assembly in which the angle of inclination of the pedal to the floor can be adjusted in accordance with the angle formed by the foot and leg of a driver without changing the throttle setting, comprising, in combination, a crank-shaped lever pivotally mounted in a bracket for movement about a horizontal axis, the arms of said lever normally lying in the same plane as the axis of pivot, one arm of said lever extending forward from said bracket on the engine side and connectable to the fuel control of said engine, the other arm of said lever extending from said bracket toward said driver, a link pivotally connected at its upper end to the end of said other arm and depending therefrom, an accelerator pedal of the harmonium type pivotally attached at its upper end to the lower end of said link and means pivotally mounting the lower end of said pedal for slidable movement of said pedal to adjust said angle of inclination, comprising a hook-shaped rod, the shank of said rod being slidably mounted in a bearing secured to said floor, the hook portion of said rod passing through said pedal lower end in a pivotal manner.

References Cited by the Examiner

UNITED STATES PATENTS

| | | | |
|---|---|---|---|
| 87,762 | 3/69 | Davis | 74—561 |
| 141,722 | 8/73 | McEvoy | 74—561 |
| 263,858 | 7/82 | Clark | 74—560 |
| 267,998 | 11/82 | Burrows | 74—561 |
| 544,940 | 8/95 | Whittingham | 74—561 |
| 562,956 | 6/96 | Ganswindt | 74—561 |
| 1,558,697 | 10/25 | Marts | 74—562 |
| 2,863,329 | 12/58 | Montgomery | 74—513 |
| 2,873,616 | 2/59 | Schilling | 74—512 X |
| 2,884,804 | 5/59 | Muller | 74—513 |
| 2,908,183 | 10/59 | DiGiovanni | 74—513 |
| 2,924,117 | 2/60 | Byrd | 74—526 |
| 2,924,118 | 2/60 | Christner | 74—513 |

BROUGHTON G. DURHAM, *Primary Examiner.*